(12) United States Patent
Kim et al.

(10) Patent No.: US 11,867,792 B2
(45) Date of Patent: Jan. 9, 2024

(54) METHOD AND APPARATUS WITH OBJECT VELOCITY DETECTION IN RADAR SYSTEM

(71) Applicant: Samsung Electronics Co., Ltd., Suwon-si (KR)

(72) Inventors: Woosuk Kim, Hwaseong-si (KR); Seongwook Lee, Seoul (KR); Seung Tae Khang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 263 days.

(21) Appl. No.: 17/145,921

(22) Filed: Jan. 11, 2021

(65) Prior Publication Data

US 2021/0247508 A1   Aug. 12, 2021

(30) Foreign Application Priority Data

Feb. 11, 2020   (KR) .......................... 10-2020-0016583

(51) Int. Cl.
*G01S 13/34* (2006.01)
*G01S 13/26* (2006.01)
(Continued)

(52) U.S. Cl.
CPC ............ *G01S 13/343* (2013.01); *G01S 13/26* (2013.01); *G01S 13/584* (2013.01); *G01S 13/931* (2013.01)

(58) Field of Classification Search
CPC .... G01S 13/931; G01S 13/584; G01S 13/582; G01S 13/343; G01S 13/345; G01S 13/26
(Continued)

(56) References Cited

U.S. PATENT DOCUMENTS 6,892,059 B1 * 5/2005 Kim ..................... H04L 25/0228
455/562.1
7,474,262 B2 * 1/2009 Alland ............... H01Q 21/0006
342/101

(Continued)

FOREIGN PATENT DOCUMENTS

JP   2007-212332 A   8/2007
JP   2007-300337 A   11/2007
(Continued)

OTHER PUBLICATIONS

Feger, et al. "A 77-GHz Fmcw Mimo Radar Based on an SiGe Single-Chip Transceiver." *IEEE Transactions on Microwave theory and Techniques*, vol. 57, issue No. 5 May 2009 (16 pages in English).

(Continued)

*Primary Examiner* — Vladimir Magloire
*Assistant Examiner* — Michael W Justice
(74) *Attorney, Agent, or Firm* — NSIP Law

(57) ABSTRACT

An object velocity detection method includes: obtaining a first reception signal and a second reception signal that are received in different time intervals through a radar sensor; determining a Doppler effect based on the first reception signal and the second reception signal; determining an angle value of an object based on a signal obtained by compensating for the Doppler effect; obtaining a compensated signal by compensating for the angle value in the second reception signal; and determining a velocity of the object based on the compensated signal.

34 Claims, 7 Drawing Sheets

(51) Int. Cl.
*G01S 13/58* (2006.01)
*G01S 13/931* (2020.01)

(58) Field of Classification Search
USPC .................................................. 342/70, 104
See application file for complete search history.

(56) References Cited

U.S. PATENT DOCUMENTS

| | | | | |
|---|---|---|---|---|
| 7,808,425 B2* | 10/2010 | Martin Neira | ........ | G01S 7/4021 |
| | | | | 342/120 |
| 8,344,943 B2* | 1/2013 | Brown | .................. | G01S 13/767 |
| | | | | 342/147 |
| 9,229,099 B2* | 1/2016 | Brown | .................. | G01S 13/222 |
| 9,304,198 B1 | 4/2016 | Doerry et al. | | |
| 10,141,657 B2* | 11/2018 | Kishigami | ............. | G01S 13/26 |
| 10,416,299 B2* | 9/2019 | Schoor | ................ | G01S 13/0209 |
| 10,473,755 B1* | 11/2019 | Doerry | .................... | G01S 13/90 |
| 10,627,483 B2* | 4/2020 | Rao | ........................ | G01S 13/343 |
| 11,092,686 B2* | 8/2021 | Rajendran | ............. | G01S 13/588 |
| 11,119,185 B2* | 9/2021 | Barkan | ................. | G01S 13/343 |
| 11,125,869 B2* | 9/2021 | Santra | .................... | G01S 13/582 |
| 11,269,042 B2* | 3/2022 | Kishigami | ................ | G01S 3/20 |
| 11,360,204 B2* | 6/2022 | Hakobyan | ............. | G01S 13/325 |
| 11,378,649 B2* | 7/2022 | Rao | ........................ | G01S 13/343 |
| 11,486,994 B2* | 11/2022 | Kishigami | ............ | G01S 13/343 |
| 2004/0004569 A1* | 1/2004 | Lam | ....................... | G01S 13/904 |
| | | | | 342/351 |
| 2007/0001897 A1* | 1/2007 | Alland | ................... | G01S 7/352 |
| | | | | 342/158 |
| 2007/0132634 A1 | 6/2007 | Wakeman | | |
| 2010/0066590 A1* | 3/2010 | Brown | ..................... | G01S 7/03 |
| | | | | 342/147 |
| 2010/0073217 A1* | 3/2010 | Martin Neira | ........ | G01S 13/882 |
| | | | | 342/120 |
| 2015/0301168 A1* | 10/2015 | Brown | .................. | G01S 13/767 |
| | | | | 342/146 |
| 2016/0285172 A1* | 9/2016 | Kishigami | .............. | G01S 7/023 |
| 2017/0131392 A1* | 5/2017 | Schoor | .................... | G01S 13/42 |
| 2018/0011170 A1 | 1/2018 | Rao et al. | | |
| 2018/0172813 A1 | 6/2018 | Rao et al. | | |
| 2019/0170870 A1 | 6/2019 | Marsch et al. | | |
| 2019/0377062 A1* | 12/2019 | Barkan | ................. | G01S 13/536 |
| 2020/0088867 A1* | 3/2020 | Rajendran | ............... | G01S 13/60 |
| 2020/0096595 A1* | 3/2020 | Kishigami | .............. | G01S 13/582 |
| 2020/0103515 A1* | 4/2020 | Kishigami | ............ | G01S 7/4026 |
| 2020/0116850 A1* | 4/2020 | Santra | .................... | G01S 13/582 |
| 2020/0182991 A1* | 6/2020 | Hakobyan | ............ | H04B 7/0413 |
| 2020/0233076 A1* | 7/2020 | Chen | ..................... | G01S 7/4865 |
| 2021/0003694 A1* | 1/2021 | Sick | ....................... | G01S 13/931 |
| 2022/0035019 A1* | 2/2022 | Zhou | ...................... | G01S 13/42 |
| 2022/0221570 A1* | 7/2022 | Zhu | ........................ | G01S 13/582 |
| 2022/0268915 A1* | 8/2022 | Ogura | .................... | G01S 13/584 |

FOREIGN PATENT DOCUMENTS

| | | |
|---|---|---|
| JP | 2010-197241 A | 9/2010 |
| JP | WO2011/067907 A1 | 6/2011 |
| JP | WO2014/006961 A1 | 1/2014 |
| JP | WO2015/104876 A1 | 7/2015 |
| JP | 2015-179061 A | 10/2015 |
| KR | 10-2019-0046694 A | 5/2019 |
| WO | WO-2021062750 A1 * | 4/2021 ........... G01S 13/343 |

OTHER PUBLICATIONS

Schmid, et al. "Motion Compensation and Efficient Array Design for TDMA FMCW MIMO Radar Systems." *6th European Conference on Antennas and Propagation EUCAP. IEEE XP-002762927,* 2011 pp. 1746-1750 (5 pages in English).

Extended European Search Report dated Jul. 5, 2021 in counterpart European Patent Application No. 21155994.3 (19 pages in English).

* cited by examiner

METHOD AND APPARATUS WITH OBJECT VELOCITY DETECTION IN RADAR SYSTEM

CROSS-REFERENCE TO RELATED APPLICATIONS

This application claims the benefit under 35 USC § 119(a) of Korean Patent Application No. 10-2020-0016583 filed on Feb. 11, 2020, in the Korean Intellectual Property Office, the entire disclosure of which is incorporated herein by reference for all purposes.

BACKGROUND

1. Field

The following description relates to a with object velocity detection in a radio detection and ranging (radar) system.

2. Description of Related Art

Vehicles may be equipped with an active safety system to protect drivers and reduce the potential risk of accidents. The active safety system may use sensors configured to recognize an external environment. Among the sensors, a radio detection and ranging (radar) sensor may be used, as the radar sensor may be more robust against weather or other external environmental conditions, compared to other sensors configured to recognize an external environment.

For the radar sensor, a signal of a frequency-modulated continuous-wave (FMCW) may used because it is easy to be produced and has relatively high performance in detecting vehicle information. The radar sensor using such an FMCW signal may transmit a chirp signal of which a frequency is linearly modulated, and a corresponding radar system may analyze a signal reflected from a target and estimate a distance to the target and a velocity of the target.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an object velocity detection method includes: obtaining a first reception signal and a second reception signal that are received in different time intervals through a radar sensor; determining a Doppler effect based on the first reception signal and the second reception signal; determining an angle value of an object based on a signal obtained by compensating for the Doppler effect; obtaining a compensated signal by compensating for the angle value in the second reception signal; and determining a velocity of the object based on the compensated signal.

The determining of the Doppler effect may include determining a phase shift value from a movement of the object based on the first reception signal and the second reception signal; and the determining of the angle value may include: compensating for the phase shift value in the second reception signal; and determining the angle value of the object using a signal obtained by compensating for the phase shift value.

The phase shift value may indicate a degree of a phase shift caused by the Doppler effect from the movement of the object.

The determining of the phase shift value may include determining the phase shift value based on a distance between receiving antennas included in the radar sensor, the number of the receiving antennas, and a distance between transmitting antennas included in the radar sensor.

The distance between the receiving antennas may be the same as the distance between the transmitting antennas.

The obtaining of the first reception signal and the second reception signal may include: receiving, as the first reception signal, a first reflection signal in response to a first transmission signal transmitted in a first time interval being reflected from the object; and receiving, as the second reception signal, a second reflection signal in response to a second transmission signal transmitted in a second time interval being reflected from the object.

The first transmission signal and the second transmission signal may be frequency-modulated continuous-wave (FMCW) signals generated based on a preset frequency modulation pattern.

The radar system may be a multiple-input and multiple-output (MIMO) radar system including a plurality of transmitting antennas and a plurality of receiving antennas.

The transmitting antennas may be configured to alternately transmit a transmission signal in different time intervals.

A maximum detectable velocity range of the object may be determined irrespective of the number of the transmitting antennas.

The maximum detectable velocity range of the object may correspond to a maximum velocity range that is detectable when the radar system includes a single transmitting antenna.

The first reception signal and the second reception signal that are received by the receiving antennas may overlap each other.

A non-transitory computer-readable storage medium may store instructions that, when executed by a processor, configure the processor to perform the method.

In another general aspect, an object velocity detection apparatus includes: a radar sensor; and a processor configured to: obtain a first reception signal and a second reception signal that are received in different time intervals through the radar sensor; determine a Doppler effect based on the first reception signal and the second reception signal; determine an angle value of an object based on a signal obtained by compensating for the Doppler effect; obtain a compensated signal by compensating for the angle value in the second reception signal; and determine a velocity of the object based on the compensated signal.

The processor may be configured to: for the determining of the Doppler effect, determine a phase shift value from a movement of the object based on the first reception signal and the second reception signal; and for the determining of the angle value, compensate for the phase shift value in the second reception signal; and determine the angle value of the object using a signal obtained by compensating for the phase shift value.

The processor may be configured to determine the phase shift value based on a distance between receiving antennas included in the radar sensor, the number of the receiving antennas, and a distance between transmitting antennas included in the radar sensor.

The radar sensor may be configured to: receive, as the first reception signal, a first reflection signal in response to a first transmission signal transmitted in a first time interval being reflected from the object; and receive, as the second reception signal, a second reflection signal in response to a second transmission signal transmitted in a second time interval being reflected from the object.

The first transmission signal and the second transmission signal may be frequency-modulated continuous-wave (FMCW) signals generated based on a preset frequency modulation pattern.

The radar system may be a multiple-input and multiple-output (MIMO) radar system including a plurality of transmitting antennas and a plurality of receiving antennas.

The transmitting antennas may be configured to alternately transmit a transmission signal in different time intervals.

A maximum detectable velocity range of the object may be determined irrespective of the number of the transmitting antennas.

The maximum detectable velocity range of the object may correspond to a maximum velocity range that is detectable when the radar system includes a single transmitting antenna.

In another general aspect, an object velocity detection method includes: transmitting a first transmission signal through a transmitting antenna during a time interval; transmitting a second transmission signal through a different transmitting antenna during a different time interval; receiving, by each of a plurality of receiving antennas, a first reception signal in response to the first transmission signal being reflected from the object and returned; receiving, by each of the receiving antennas, a second reception signal in response to the second transmission signal being reflected from the object and returned; determining a Doppler effect based on the first reception signals and the second reception signals; determining an angle value of the object based on a signal obtained by compensating for the Doppler effect; obtaining compensated signals by compensating for the angle value in the second reception signals; and determining a velocity of the object based on the compensated signals.

The first transmission signal and the second transmission signal may be the same signals.

The first transmission signal and the second transmission signal may have a same carrier frequency characteristic.

The first transmission signal and the second transmission signal may be frequency-modulated continuous-wave (FMCW) signals.

At least one of the first reception signals and at least one of the second reception signals may be signals overlapping each other.

The receiving antennas may include a receiving antenna and a different receiving antenna, and a phase difference of the first reception signal of the receiving antenna and a phase difference of the second reception signal of the different receiving antenna may be the same.

In another general aspect, an object velocity detection method includes: receiving, using a radar sensor, a first reception signal and a second reception signal in different time intervals; determining a phase shift value from a movement of the object based on the first reception signal and the second reception signal; determining a first compensated signal by removing the phase shift value from the second reception signal; determining an angle value of an object based on the first reception signal and the first compensated signal; determining a second compensated signal by removing the angle value from the second reception signal; and determining a velocity of the object based on the second compensated signal.

Other features and aspects will be apparent from the following detailed description, the drawings, and the claims.

Figure 1:
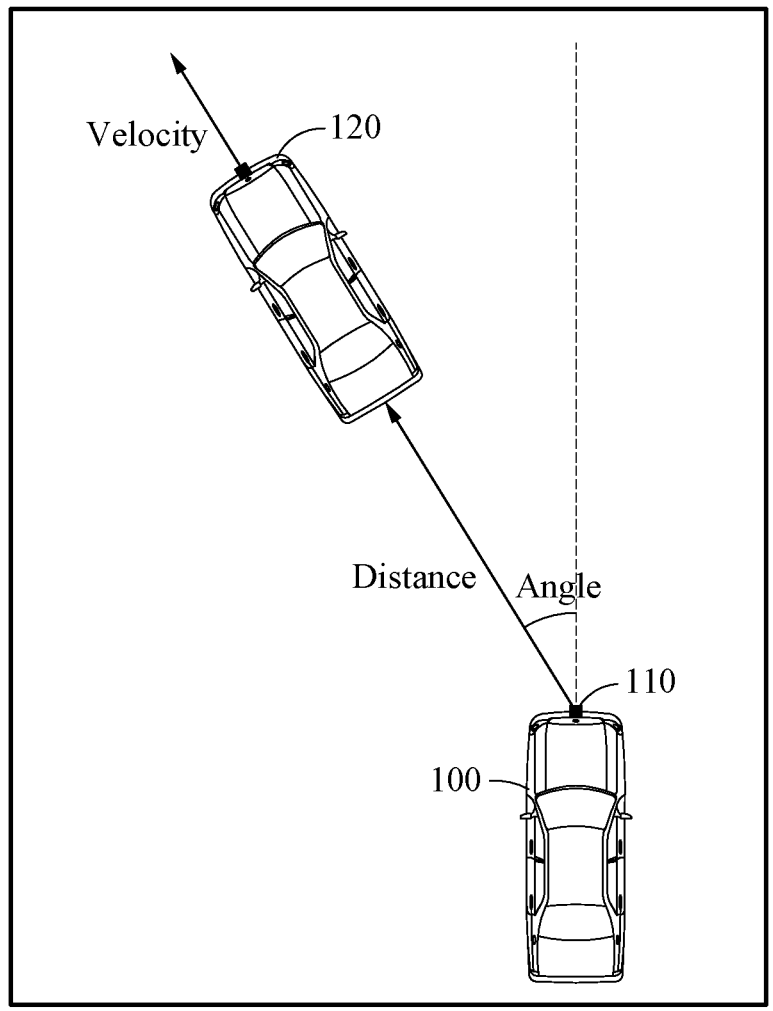
FIG. 1 illustrates an example of measuring a position of an object in a radio detection and ranging (radar) system.

Throughout the drawings and the detailed description, unless otherwise described or provided, the same reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

In addition, terms such as first, second, A, B, (a), (b), and the like may be used herein to describe components. Each of these terminologies is not used to define an essence, order, or sequence of a corresponding component but used merely to distinguish the corresponding component from other component(s). Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of measuring a position of an object in a radio detection and ranging (radar) system.

Referring to FIG. 1, in a radar system, an apparatus for measuring a position of an object, hereinafter referred to as an object position measuring apparatus 100, may measure a position of an object 120 present around the object position measuring apparatus 100 using a radar sensor 110 of the object position measuring apparatus 100. The position of the object 120 may be represented by a distance between the radar sensor 110 and the object 120, a velocity of the object 120, and an angle determined by a positional relationship between the radar sensor 110 and the object 120. According to examples, the object position measuring apparatus 100 may be used for a system that provides drivers with safety and convenience through various sensors provided inside or outside a vehicle. The system may include, for example, an advanced driver assistance system (ADAS), a flight radar system, an autonomous driving system, a recognition system such as a facial recognition system and a gesture recognition system, a surveillance/security system, and the like.

The radar sensor 110 may be provided inside or outside the object position measuring apparatus 100. The radar sensor 110 may radiate a transmission signal through at least one transmitting antenna to estimate the position of the object 120. In an example, the radar sensor 110 may include a plurality of transmitting antennas and a plurality of receiving antennas, and radiate a frequency-modulated continuous-wave (FMCW) transmission signal of which a carrier frequency varies based on a time through the transmitting antennas. The transmission signal radiated from the radar sensor 110 may be reflected from the object 120, and such a reflected signal may be obtained through the receiving antennas included in the radar sensor 110.

In an example, the object position measuring apparatus 100 may perform a function of, and may include, an apparatus for detecting a velocity of an object, hereinafter simply referred to as an object velocity detecting apparatus. The function may include detecting a velocity of the object 120. The object velocity detecting apparatus may estimate a velocity of the object 120 by analyzing reception signals obtained by being reflected from the object 120 and then received through the receiving antennas. Hereinafter, an example of how the object velocity detecting apparatus provided in a vehicle detects a velocity of an object present around the vehicle as illustrated in FIG. 1 will be described. However, a scope of examples is not limited to the example to be mainly described hereinafter. The object velocity detecting apparatus may be used in various applications that need velocity information of an object.

In the case of a radar system for a vehicle, position information of an object present around a vehicle may be used to provide various ADAS functions. As described above, a position of the object may be represented by a distance to the object, a velocity (absolute velocity or relative velocity) of the object, and an angle formed by the position of the object. The object velocity detecting apparatus may estimate a velocity of the object in the radar system by performing a method of detecting a velocity of an object, hereinafter referred to as an object velocity detecting method. An example of the object velocity detecting method will be described hereinafter in further detail. The object velocity detecting apparatus may provide a technical solution to effectively solve an issue of a reduction in a maximum detectable velocity range that may occur in a time-division multiplexing (TDM) multiple-input and multiple-output (MIMO) (TDM MIMO) radar system.

Figure 2:
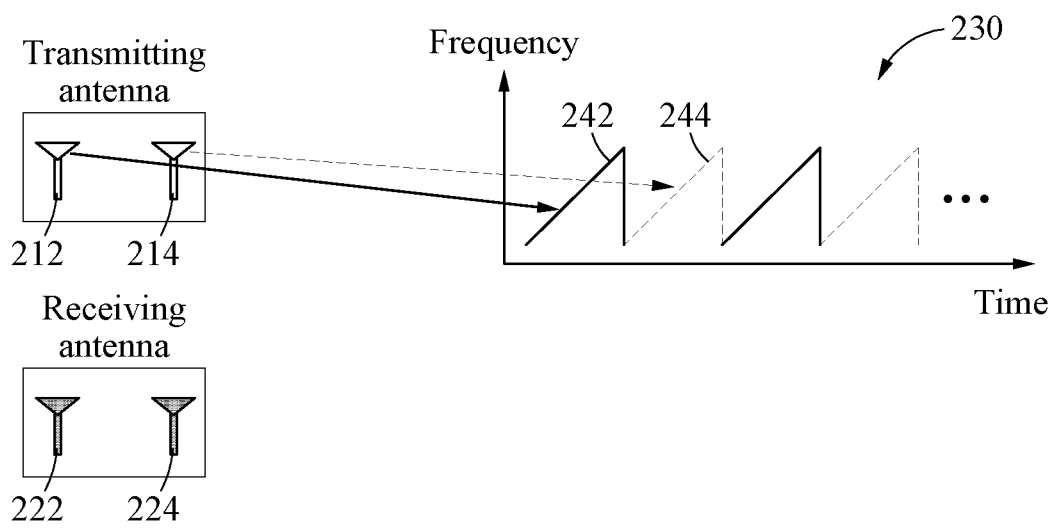
FIG. 2 illustrates an example of a time-division multiplexing (TDM) multiple-input and multiple-output (MIMO) (TDM MIMO) radar system.

FIG. 2 illustrates an example of a TDM MIMO radar system.

Estimating a position of an object through a radar sensor may include estimating an angle formed between the radar sensor and the object, in addition to a distance to the object and a velocity of the object. An angular resolution, which indicates a capability of distinguishing different objects present nearby, may be proportional to the number of receiving antennas included in the radar sensor. In the case of a MIMO radar system using a plurality of transmitting antennas, the number of receiving antennas may virtually increase by a product from multiplication between the number of the transmitting antennas and the number of the receiving antennas, and thus the angular resolution may increase. When the angular resolution increases, it is possible to more specifically measure an angle of an object.

When the transmitting antennas included in the MIMO radar system transmit transmission signals simultaneously, the receiving antennas may not distinguish the various transmission signals. Thus, using such a plurality of transmitting antennas may no longer effective. To prevent such an issue, a TDM method through which the transmitting antennas alternately transmit a transmission signal may be used.

In an example, an object velocity detecting apparatus may operate in a TDM MIMO radar system which is a MIMO radar system operating using the TDM method. The TDM MIMO radar system may effectively operate in a radar system for a vehicle that detects a fast moving object, for example. Referring to FIG. 2, a TDM MIMO radar system may include a plurality of transmitting antennas 212 and 214, and a plurality of receiving antennas 222 and 224. Although the number of the transmitting antennas 212 and 214 and the number of the receiving antennas 222 and 224 are illustrated as two, respectively, the number of transmitting antennas and the number of receiving antennas are not limited to two as illustrated. For example, the number of transmitting antennas and the number of receiving antennas may be three or more, respectively.

In the example of FIG. 2, a graph 230 indicates waveforms of FMCW transmission signals 242 and 244 transmitted through the transmitting antennas 212 and 214 based on time. The transmitting antennas 212 and 214 may alternately transmit, on a periodic basis, the FMCW transmission signals 242 and 244 of which carrier frequencies vary linearly according to the TDM method. For example, a first transmission signal 242 may be transmitted from a first transmitting antenna 212 in a first time interval, and then a second transmission signal 244 may be transmitted from a second transmitting antenna 214 in a second time interval. Subsequently, the first transmission signal 242 and the second transmission signal 244 may be transmitted alternately and repeatedly as described in the foregoing.

In the MIMO radar system using the TDM method, a detectable velocity range of an object may be determined by a time interval between transmission signals transmitted by one transmitting antenna on a specific time period. In such a case, a maximum detectable velocity of the object may decrease in proportion to the number of transmitting antennas. For example, when the number of transmitting antennas is two as illustrated in FIG. 2, a maximum detectable velocity of an object may decrease by half, compared to when the number of transmitting antennas is one. In addition, when the number of transmitting antennas is three, a maximum detectable velocity of an object may be ⅓ times, compared to when the number of transmitting antennas is one. For example, when a maximum detectable velocity range of an object in the case in which the number of transmitting antennas is one is [−100 meters per second [m/s] to 100 m/s], the maximum detectable velocity range may decrease to [−50 m/s to 50 m/s] in the case in which the number of transmitting antennas is two. Due to such a decrease in a maximum detectable velocity range, a velocity of an object may not be normally or accurately estimated. For example, when an actual velocity of an object is out of a given maximum detectable velocity range of a radar system, a plurality of velocity values of the object may be detected as the velocity of the object. Such a detection result may include a false velocity value indicating an incorrect velocity of the object, and may prevent accurate estimation of the velocity of the object.

In an example, the object velocity detecting apparatus of one or more embodiments may process reception signals obtained through receiving antennas (for example, the receiving antennas 222 and 224 illustrated in FIG. 2) and estimate a velocity of an object without a reduction in a maximum detectable velocity range even in the TDM MIMO radar system. Thus, the object velocity detecting apparatus of one or more embodiments may reduce the likelihood that an actual velocity value is incorrectly estimated. In addition, the object velocity detecting apparatus of one or more embodiments may restore the maximum detectable velocity range that may be reduced by the number of transmitting antennas, while maintaining a high level of performance in an angular resolution that is attributed to the number of the transmitting antennas in the TDM MIMO radar system.

Figure 3:
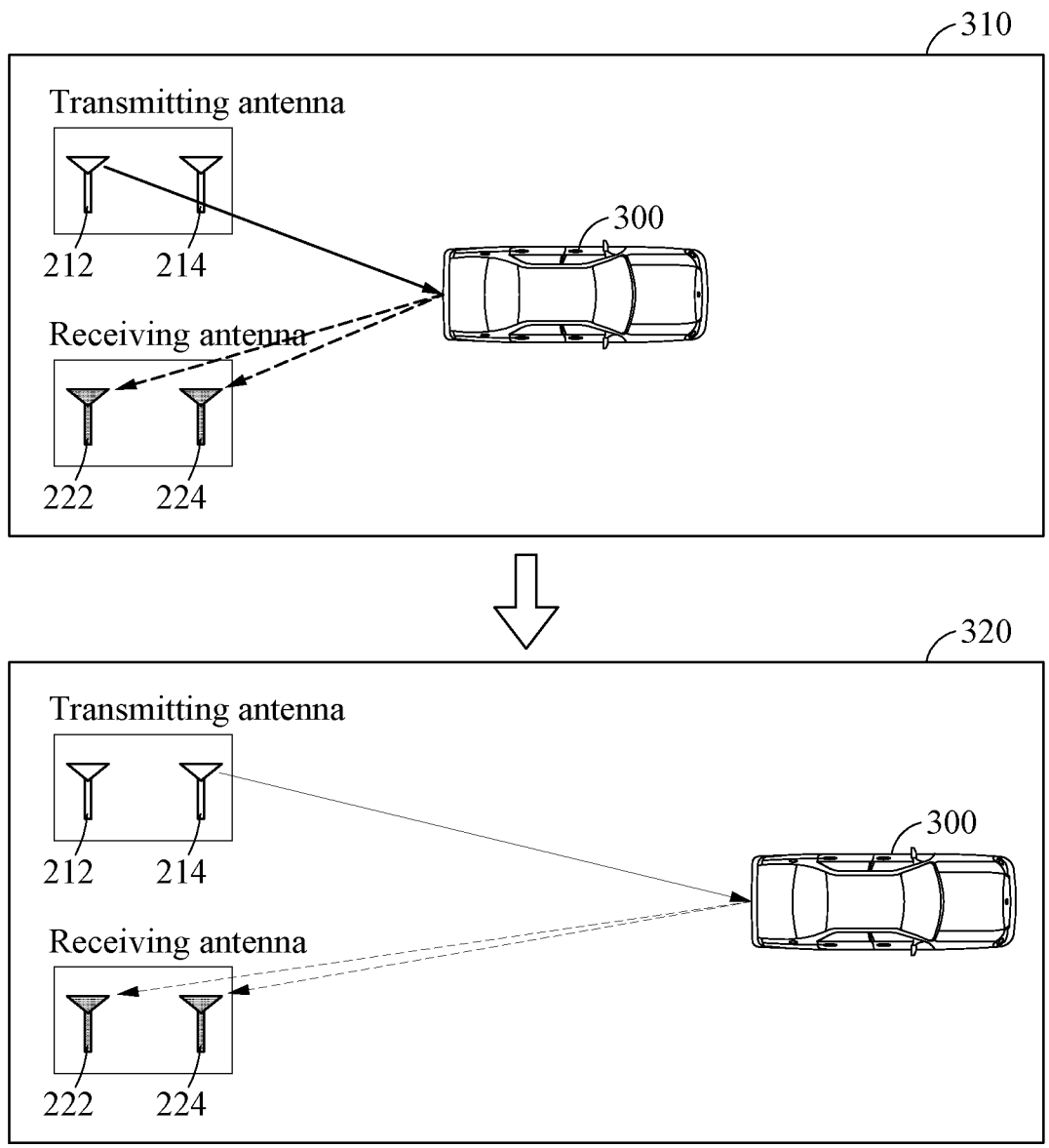
FIG. 3 illustrates an example of a Doppler effect in a TDM MIMO radar system.

FIG. 3 illustrates an example of a Doppler effect in a TDM MIMO radar system.

In the example of FIG. 3, a relative distance between an object 300 and a radar sensor may change as the object 300 moves. In a TDM MIMO radar system using a TDM method, a first transmitting antenna 212 may transmit a first transmission signal, and a second transmitting antenna 214 may then transmit a second transmission signal. In the example of FIG. 3, in a first time interval 310, the first transmitting antenna 212 transmits the first transmission signal and the first transmission signal is reflected from the object 300 and then obtained by receiving antennas 222 and 224 as first reception signals. Subsequently, in a second time interval 320, the second transmitting antenna 214 transmits the second transmission signal and the second transmission signal is reflected from the object 300 and then obtained by the receiving antennas 222 and 224 as second reception signals.

In this example, the object 300 moves in a time interval between a point in time at which the first transmission signal is reflected from the object 300 and a point in time at which the second transmission signal is reflected from the object 300. Due to such a movement of the object 300, a Doppler effect may occur. The Doppler effect may be a phenomenon in which a frequency and a wavelength of reception signals change due to a relative velocity between the object 300 and the radar sensor. The Doppler effect may be a factor that reduces a level of accuracy in estimating an angle of the object 300. An object velocity detecting apparatus may calculate a phase shift value caused by such a Doppler effect between reception signals obtained in different time intervals (e.g., the first time interval 310 and the second time interval 320), and accurately estimate an angle value of the object 300 by compensating for the phase shift value in the reception signals. The object velocity detecting apparatus may compensate for the accurately estimated angle value of the object 300 in the initially obtained reception signals, and estimate a velocity value of the object 300 based on reception signals obtained by compensating for the angle value. Through such an estimation method, the object velocity detecting apparatus may accurately estimate a velocity of the object 300 without a reduction in a maximum detectable velocity range that may occur due to the use of a plurality of transmitting antennas in a TDM MIMO radar system.

Figure 4:
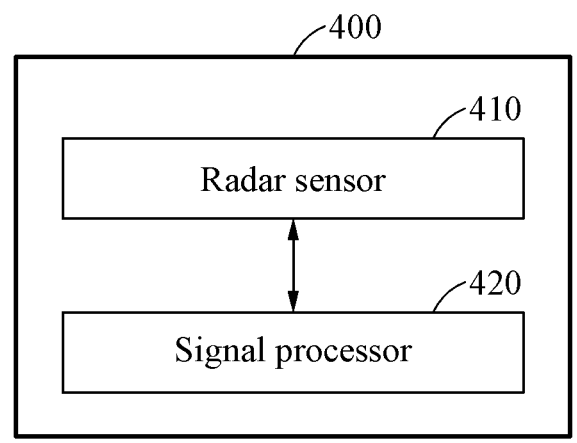
FIG. 4 illustrates an example of a configuration of an apparatus for detecting a velocity of an object in a radar system.

FIG. 4 illustrates an example of a configuration of an object velocity detecting apparatus in a radar system.

Referring to FIG. 4, an object velocity detecting apparatus 400 may include a radar sensor 410 and a signal processor 420.

The radar sensor 410 may sense radar data. For example, the radar sensor 410 may transmit a transmission signal of which a carrier frequency varies over time through one or more transmitting antennas, and obtain, as a reception signal, a signal reflected as the transmission signal is reflected from an object, through one or more receiving antennas. In an example, the radar sensor 410 may include a plurality of transmitting antennas and a plurality of receiving antennas, and operate according to a TDM method that alternately transmits transmission signals through transmitting antennas in different time intervals.

A transmission signal may be an FMCW signal generated based on a preset frequency modulation pattern, for example. The FMCW signal may be radiated to an outside of the radar sensor 410 through a transmitting antenna. The radiated FMCW signal may be reflected from an object, and a reflection signal, which is a signal obtained as the FMCW signal is reflected from the object, may be received by the receiving antennas to form the radar data. For example, the radar sensor 410 may receive, as a first reception signal, a first reflection signal obtained when a first transmission signal transmitted in a first time interval is reflected from an object and receive, as a second reception signal, a second reflection signal obtained when a second transmission signal transmitted in a second time interval is reflected from the object. The first transmission signal and the second transmission signal that are transmitted through the transmitting antennas may be signals of a same type (e.g., may have a same carrier frequency characteristic). The first reception signal and the second reception signal that are received by the receiving antennas may be signals overlapping each other.

The signal processor 420 may control operations and functions of the object velocity detecting apparatus 400. The signal processor 420 may include at least one processor (not shown). In an example, the signal processor 420 may set a detection area and a detection resolution of the object velocity detecting apparatus 400, and adjust a characteristic of a transmission signal based on the set detection area and the set detection resolution. For example, the signal processor 420 may adjust a carrier frequency characteristic of the transmission signal, for example, a frequency range, a gradient, a frequency change time, and the like, and/or an intensity characteristic of the transmission signal. The detection area may be set based on a detection distance and a detection angle. The detection resolution may be set based on a detection unit for a position of an object (for example, 1 meter (m), 50 centimeters (cm), and the like).

The signal processor 420 may estimate a velocity of an object by analyzing the radar data sensed through the radar sensor 410. A velocity of the object may be one of sets of position information that specifies a position of the object. According to examples, the signal processor 420 may measure different position information, for example, a distance to an object and an angle formed with the object, in addition to a velocity of the object. The signal processor 420 may sequentially compensate for a Doppler effect in a reception signal and for an angle value of an object, and estimate a velocity of the object based on a compensated signal obtained through the sequential compensation.

In an example, the signal processor 420 may obtain a first reception signal and a second reception signal that are received in different time intervals through the radar sensor 410, and store the obtained first reception signal and the obtained second reception signal. The signal processor 420 may estimate a phase shift value that is indicated in the second reception signal as a Doppler effect caused by a movement of the object, based on the first reception signal and the second reception signal. The signal processor 420 may calculate the phase shift value using an antenna overlapping algorithm, for example. The signal processor 420 may estimate the phase shift value based on a distance between the receiving antennas included in the radar sensor 410, the number of the receiving antennas, and a distance between the transmitting antennas included in the radar sensor 410.

The signal processor 420 may compensate for the phase shift value in the second reception signal, obtain a compensated signal by compensating for the phase shift value, and estimate the angle value of the object using the compensated signal obtained by compensating for the phase shift value. For example, the signal processor 420 may estimate the angle value using, for example, a fast Fourier transform (FFT) algorithm, a digital beamforming (DBF) algorithm, estimation of signal parameters via rotational invariance techniques (ESPRIT), and/or a multiple signal classification (MUSIC) algorithm.

In an example, the signal processor 420 may obtain a beat frequency signal indicating a frequency difference between a transmission signal and a reception signal obtained by compensating for a phase shift value caused by a Doppler effect. The beat frequency signal may also be referred to as an intermediate frequency signal. The signal processor 420 may extract sets of sample data from the beat frequency signal, and estimate angle information, for example, angle of arrival (AoA) information, based on the extracted sets of sample data. The signal processor 420 may extract the sets of sample data by sampling the beat frequency signal corresponding to a chirp signal at a plurality of sampling points. The chirp signal may indicate a signal of which a frequency varies over time. The signal processor 420 may sample the beat frequency signal at the sampling points, and obtain the sets of sample data through analog-to-digital conversion that converts a sampled analog signal into a digital signal.

The signal processor 420 may estimate the angle value of the object based on beat frequency signals respectively corresponding to the receiving antennas. An example of estimating an angle value may be represented as follows.

Sets of sample data of a beat frequency signal may be represented by Equation 1 below, for example.

$$Y=[Y(1),Y(2),\ldots,Y(i),\ldots,Y(N-1),Y(N)] \quad \text{Equation 1:}$$

In Equation 1, i denotes a time index. N denotes the number of sets of sample data obtained by sampling a beat frequency signal, and is a natural number greater than or equal to 1. i is a natural number greater than or equal to 1 and less than or equal to N. Y denotes data obtained by converting a beat frequency signal of an analog value into a digital value. For example, when a receiving antenna array included in the radar sensor 410 includes M receiving antennas, sample data Y(i) at an ith sampling point corresponding to a time index i may be represented by Equation 2 below, for example.

$$Y(i)=[s_1(i),s_2(i),\ldots,s_m(i),\ldots,s_{M-1}(i),s_M(i)]^T \quad \text{Equation 2:}$$

In Equation 2, $s_m(i)$ denotes a value in ith sample data that is obtained by sampling a signal intensity of a reception signal received by an mth receiving antenna among the M receiving antennas. M is a natural number greater than or equal to 2, and m is a natural number greater than or equal to 1 and less than or equal to M. A normalization model may be applied to the sample data Y(i), and be represented by Equation 3 below.

$$A_{pNorm}=\{A_{pNorm,1},\ldots,A_{pNorm,i},\ldots,A_{pNorm,N}\} \quad \text{Equation 3:}$$

In Equation 3, $A_{pNorm,i}$ denotes an ith normalization matrix to be applied to a value of the ith sample data among the sets of sample data. The ith normalization matrix may be represented by Equation 4 below, for example.

$$A_{pNorm,i} = A_{f0}^{-1} A_{fi} \quad \text{Equation 4:}$$

In Equation 4, $A_{fi}$ denotes a first matrix operation for the ith sample data that convers a time-domain value corresponding to the ith sample data to angle information using a carrier frequency corresponding to ith sample data of a frequency modulation model. $A_{f0}^{-1}$ is an inverse matrix of $A_{f0}$, and denotes a second matrix operation that inversely converts angle information to a time-domain value using a reference frequency $f_0$. The first matrix operation $A_{fi}$ in Equation 4 may be represented by Equations 5 and 6 below, for example.

$$A_{fi} = [\alpha_{fi}(\theta_1), \ldots, \alpha_{fi}(\theta_k), \ldots, \alpha_{fi}(\theta_K)]^T \quad \text{Equation 5:}$$

$$\alpha_{f_i}(\theta_k) = \left[1, e^{\frac{j2\pi d}{\lambda_{f_i}} \sin\theta_k}, \ldots, e^{\frac{j2\pi(M-1)d}{\lambda_{f_i}} \sin\theta_k}\right] \quad \text{Equation 6}$$

In Equation 5 above, the first matrix operation $A_{fi}$ may be represented as a set of vector $\alpha_{fi}(\theta_k)$. Herein, K denotes a natural number greater than or equal to 1, and k denotes a natural number greater than or equal to 1 and less than or equal to K. In Equation 6 above, d denotes a distance or interval between receiving antennas in an antenna array included in the radar sensor 410. j denotes an imaginary unit. $\lambda_{fi}$ denotes a wavelength corresponding to a carrier frequency of the ith sample data. $\theta_k$ denotes a kth angle in $A_{fi}$. $\alpha_{fi}(\theta_k)$ denotes a vector corresponding to an angle $\theta_k$ at a carrier frequency corresponding to an ith time index of the frequency modulation model. $A_{fi}$ denotes a K×M matrix including K rows and M columns.

$A_{fi}Y(i)$ indicating a result of a matrix multiplication between the matrix $A_{fi}$ in Equation 5 and Y(i) in Equation 2 denotes a K×1 dimensional vector. In the matrix multiplication result $A_{fi}Y(i)$, an element in a kth row may be a value corresponding to a probability that Y(i) is the kth angle $\theta_k$ and indicate angle information. Thus, based on a result of applying the first matrix operation $A_{fi}$ to the ith sample data Y(i), an angle value of the object in the ith time index may be estimated. The signal processor 420 may obtain a compensated signal by compensating for the estimated angle value in an initially obtained second reception signal, and estimate a velocity of the object based on the obtained compensated signal.

As described above, in a radar system using a plurality of transmitting antennas and a plurality of receiving antennas, the object velocity detecting apparatus 400 may estimate a velocity of an object by compensating for a result of estimating an angle of the object in a reception signal, without a reduction in a maximum detectable velocity range. The maximum detectable velocity range may have a consistent range irrespective of the number of the transmitting antennas included in the radar system. That is, the maximum detectable velocity range restored by the object velocity detecting apparatus 400 may correspond to a maximum velocity range that is detectable when the radar system includes a single transmitting antenna, and thus may not be affected by the number of the transmitting antennas. In an example, the object position measuring apparatus 100 of FIG. 1 may include the object velocity detecting apparatus 400.

Figure 5:
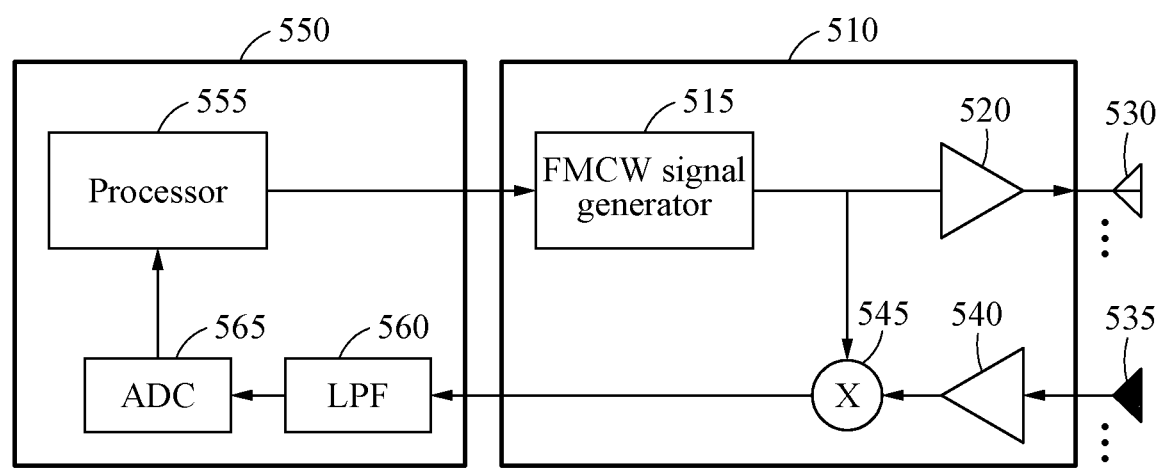
FIG. 5 illustrates an example of a detailed configuration of an apparatus for detecting a velocity of an object in a radar system.

FIG. 5 illustrates an example of a detailed configuration of an object velocity detecting apparatus (e.g., the object velocity detecting apparatus 400) in a radar system.

Referring to FIG. 5, an object velocity detecting apparatus may include a radar sensor 510 and a signal processor 550.

The radar sensor 510 may generate an FMCW signal based on a frequency modulation control signal transmitted from the signal processor 550, and transmit the generated FMCW signal as a transmission signal through a transmitting antenna 530. In addition, the radar sensor 510 may obtain, through a receiving antenna 535, a reception signal when the FMCW signal is reflected from an object and incident thereon.

The radar sensor 510 may include an FMCW signal generator 515, a power amplifier 520, the transmitting antenna 530, the receiving antenna 535, a low-noise amplifier 540, and a frequency mixer 545. Here, the transmitting antenna 530 may be provided as a plurality of transmitting antennas, and the receiving antenna 535 may be provided as a plurality of receiving antennas.

The FMCW signal generator 515 may generate an FMCW signal of which a carrier frequency varies over time based on a frequency modulation control signal transmitted from the signal processor 550. The FMCW signal generated by the FMCW signal generator 515 may have a waveform in which the carrier frequency gradually increases in some time intervals and gradually decreases in other time intervals. For example, the FMCW signal generator 515 may include a voltage-controlled oscillator (VCO) circuit for generating various oscillation frequencies, and a phase-locked loop (PLL) circuit for improving stability of an output frequency of the VCO circuit.

The FMCW signal generated by the FMCW signal generator 515 may be transmitted to the power amplifier 520. The power amplifier 520 may amplify the received FMCW signal and transmit the amplified FMCW signal to the transmitting antenna 530. The transmitting antenna 530 may radiate the amplified FMCW signal as a transmission signal. The transmitting antenna 530 may radiate the transmission signal in a corresponding time interval (for each of the transmitting antennas) according to a time division method.

The receiving antenna 535 may receive, as a reception signal, a reflection signal that is obtained as the radiated FMCW signal is reflected from an object and then returned. The low-noise amplifier 540 may amplify only a reception signal component excluding noise from the reception signal, and output the reception signal with the amplified reception signal component. The frequency mixer 545 may demodulate a signal prior to frequency modulation, for example, an original chirp signal, from the reception signal amplified by the low-noise amplifier 540, and transmit the demodulated signal to the signal processor 550.

The signal processor 550 may estimate velocity information of the object by processing the reception signal transmitted from the radar sensor 510. The signal processor 550 includes a processor 555, a low-pass filter (LPF) 560, and an analog-to-digital converter (ADC) 565.

The LPF 560 may filter a low-frequency band signal from the reception signal transmitted from the radar sensor 510, and reduce noise of a high-frequency component that is included in the reception signal. The ADC 565 may convert, to a digital signal, an analog reception signal obtained through the low-pass filtering. The processor 555 may output, to the FMCW signal processor 515, the frequency modulation control signal to allow the FMCW signal processor 515 to generate the FMCW signal, and estimate a velocity of the object based on the reception signal through a signal processing operation. In an example, the processor 555 may compensate for a phase shift value caused by a Doppler effect in the reception signal, and estimate an angle of the object based on a compensated signal obtained by compensating for the phase shift value. The processor 555 may compensate for the estimated angle in the reception signal, and estimate a velocity of the object based on a reception signal obtained by compensating for the angle.

Figure 6:
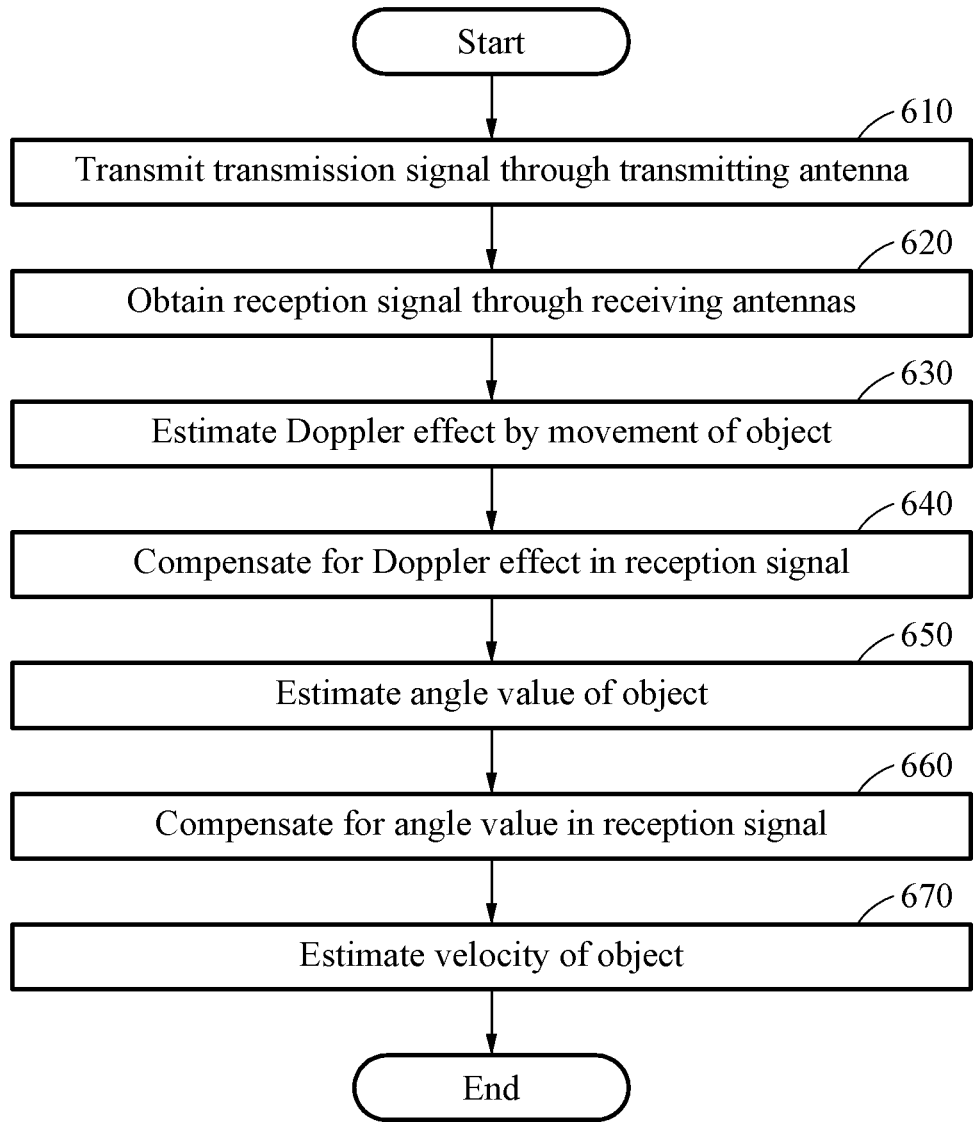
FIG. 6 illustrates an example of a flow of operations to be performed by an apparatus for detecting a velocity of an object.

FIG. 6 illustrates an example of a flow of operations to be performed by an object velocity detecting apparatus. The object velocity detecting apparatus may detect a velocity of an object using a radar device including a plurality of transmitting antennas and a plurality of receiving antennas.

Referring to FIG. 6, in operation 610, the object velocity detecting apparatus may transmit a transmission signal through a transmitting antenna. For example, the object velocity detecting apparatus may transmit an FMCW signal of which a carrier frequency varies over time. In an example, the object velocity detecting apparatus may repeatedly transmit a transmission signal on a period of N (natural number greater than or equal to 2) through K (natural number greater than or equal to 2) transmitting antennas. The object velocity detecting apparatus may alternately and repeatedly transmit a transmission signal using different transmitting antennas according to a TDM method. In an example, the object velocity detecting apparatus may transmit a first transmission signal through one transmitting antenna during a certain time interval, and transmit a second transmission signal through another transmitting antenna during another time interval different from the certain time interval. In this example, the first transmission signal and the second transmission signal may be FMCW signals of the same type.

In operation 620, the object velocity detecting apparatus may obtain a reception signal through receiving antennas. The transmission signal transmitted from the transmitting antenna may strike on at least one object present in front of a radar sensor and reflected, and then be incident on the receiving antennas. In an example, each of the receiving antennas may obtain a first reception signal when a first transmission signal is reflected from the object and then returned, and obtain a second reception signal when a second transmission signal is reflected from the object and then returned. The object velocity detecting apparatus may store reception signals that are incident on the receiving antennas and received by the receiving antennas, for each of all periods. For example, the object velocity detecting apparatus may store all sets of data, starting from data $D_1$ of a reception signal received in a first period to data $D_F$ of a reception signal received in an Fth period. In this example, F is a natural number greater than or equal to 2.

In operation 630, the object velocity detecting apparatus may estimate a Doppler effect that is caused by a movement of the object (for example, a relative velocity difference from the radar sensor) based on the stored reception signals. The object velocity detecting apparatus may calculate a phase shift value due to the movement of the object based on the reception signals using an antenna overlapping algorithm, for example.

In operation 640, the object velocity detecting apparatus may compensate for the Doppler effect in the reception signal obtained in operation 620. The object velocity detecting apparatus may remove a component corresponding to the phase shift value from the reception signals by compensating for the phase shift value indicating the Doppler effect in the data of the previously stored reception signals. By compensating for the Doppler effect, the reception signals may become a type of signal that is suitable for estimation of an angle of the object.

In operation 650, the object velocity detecting apparatus may estimate an angle value of the object based on a reception signal obtained by compensating for the Doppler effect. In an example, the object velocity detecting apparatus may estimate a Doppler effect based on a first reception signal and a second reception signal, and estimate an angle value of the object based on a compensated signal obtained by compensating for the Doppler effect.

For example, when result data $D_{1d}$ through $D_{Fd}$ is obtained by compensating for a Doppler effect in the data $D_1$ through $D_F$ of the reception signals, the object velocity detecting apparatus may estimate an angle value (for example, an AoA) of the object based on the result data $D_{1d}$ through $D_{Fd}$. The object velocity detecting apparatus may estimate the angle value using various methods (for example, an FFT algorithm, a DBF algorithm, ESPRIT, and/or a MUSIC algorithm). For example, the ESPRIT may estimate an AoA using a characteristic that there is invariant transition between sub-arrays of antennas arranged in a radar sensor. The MUSIC algorithm may estimate an AoA using a characteristic that a direction vector of a reception signal to be arrived and an eigenvector of a signal subspace are orthogonal to each other.

In operation 660, the object velocity detecting apparatus may compensate for the angle value of the object in the reception signal obtained in operation 620. In an example, the object velocity detecting apparatus may obtain a compensated signal by compensating for an angle value in a second reception signal. For example, the object velocity detecting apparatus may generate result data $D_{1a}$ through $D_{Fa}$ obtained by compensating for an angle value of the object in the data $D_1$ through $D_F$ of the previously stored reception signals. The object velocity detecting apparatus may remove a component corresponding to the angle value of the object from the data $D_1$ through $D_F$ of the reception signals by compensating for the angle value of the object in the data $D_1$ through $D_F$ of the reception signals.

In operation 670, the object velocity detecting apparatus may estimate a velocity of the object based on a signal obtained by compensating for the angle value. The object velocity detecting apparatus may estimate the velocity of the object based on the result data $D_{1a}$ through $D_{Fa}$ obtained by compensating for the angle value of the object. Through a velocity estimating method described above, even when the estimated velocity of the object is out of a maximum detectable velocity range $[-V_{max}/K$ to $V_{max}/K]$ that is reduced by using K transmitting antennas, the object velocity detecting apparatus may still effectively estimate the velocity of the object when the velocity of the object is a value between $-V_{max}$ and $V_{max}$. Here, $V_{max}$ denotes a maximum detectable velocity in a radar system including a single transmitting antenna.

Figure 7A:
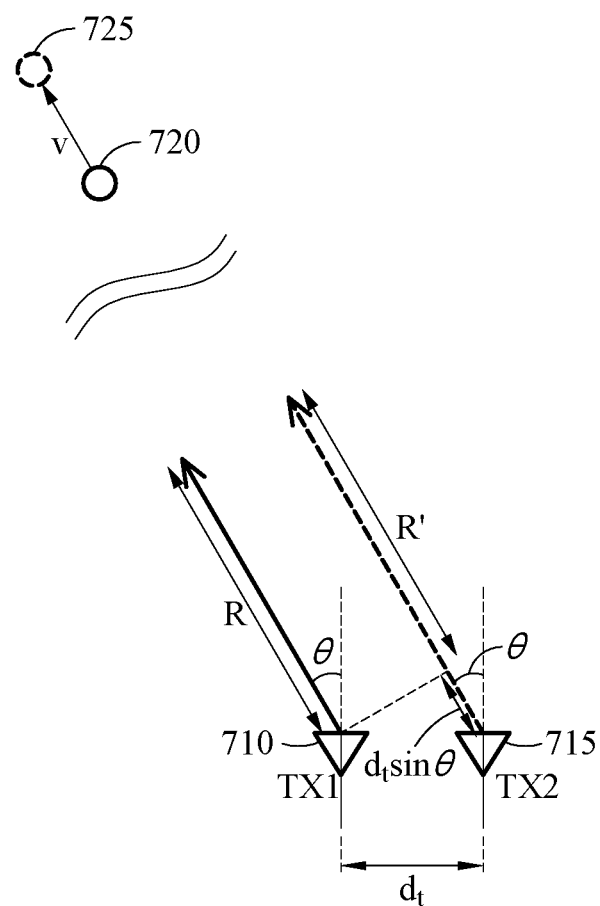
FIGS. 7A and 7B illustrates examples of detecting a velocity of an object.
Figure 7B:
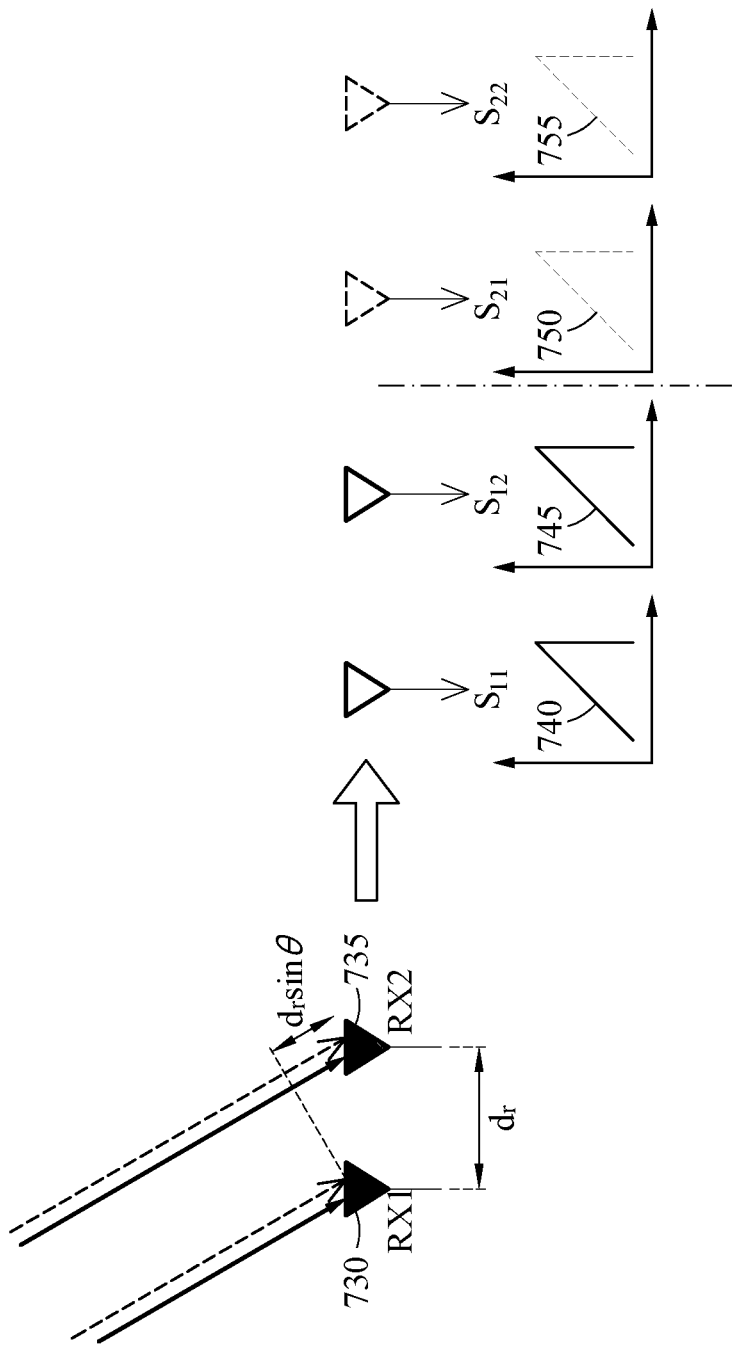

FIGS. 7A and 7B illustrate examples of detecting a velocity of an object.

Referring to FIG. 7A, a radar system includes a transmitting antenna TX1 710 and a transmitting antenna TX2 715. A distance between the two transmitting antennas 710 and 715 is $d_t$, and the transmitting antenna 710 and the transmitting antenna 715 may alternately transmit a transmission signal. A phase difference by the distance $d_t$ between the transmitting antennas 710 and 715 may be $d_t \sin \theta$, and a distance from the transmitting antenna 715 to an object may be $(R' + d_t \sin \theta)$. In an example, due to a movement of an object that moves at a velocity v, a first transmission signal (or a first chirp signal) transmitted from the transmitting antenna 710 may be reflected from the object located at a first position 720, and a second transmission signal (or a second chirp signal) transmitted from the transmitting antenna 715 may be reflected from the object located at a second position 725.

Referring to FIG. 7B, the radar system includes a receiving antenna RX1 730 and a receiving antenna RX2 735. A distance between the two receiving antennas 730 and 735 is $d_r$, and a phase difference by the distance $d_r$ between the receiving antennas 730 and 735 may be $d_r \sin \theta$ In the example of FIG. 7B, reception signals respectively received by the receiving antennas 730 and 735 are also illustrated. In the example, a reception signal 740 obtained by the receiving antenna 730 when the first transmission signal transmitted from the transmitting antenna 710 in a first time interval is reflected from the object is $S_{11}$, and a reception signal 745 obtained by the receiving antenna 735 when the first transmission signal transmitted from the transmitting antenna 710 in the first time interval is reflected from the object is $S_{12}$. In addition, a reception signal 750 obtained by the receiving antenna 730 when the second transmission signal transmitted from the transmitting antenna 715 in a second time interval is reflected from the object is $S_{21}$, and a reception signal 755 obtained by the receiving antenna 735 when the second transmission signal transmitted from the transmitting antenna 715 in the second time interval is reflected from the object is $S_{22}$. In this example, the reception signals $S_{11}$, $S_{12}$, $S_{21}$, and $S_{22}$ may be modeled as represented respectively by Equations 7 through 10 below, for example.

$$S_{11} = A_{11} e^{jk2R} \qquad \text{Equation 7:}$$

$$S_{12} = A_{12} e^{jk(2R + d_r \sin \theta)} \qquad \text{Equation 8:}$$

$$S_{21} = A_{21} e^{jk(2R' + d_t \sin \theta)} \qquad \text{Equation 9:}$$

$$S_{22} = A_{22} e^{jk(2R' + d_t \sin \theta + d_r \sin \theta)} \qquad \text{Equation 10:}$$

In Equations 7 through 10 above, $A_{11}$, $A_{12}$, $A_{21}$, and $A_{22}$ denote respective magnitudes of the reception signals $S_{11}$, $S_{12}$, $S_{21}$, and $S_{22}$. j denotes an imaginary unit.

A phase difference PD between the first transmission signal and the second transmission signal may be represented by Equation 11 below, for example.

$$PD = k(2R' - 2R) = k2vT_c = 2\pi f_D T_c \qquad \text{Equation 11:}$$

In Equation 11, $T_c$ denotes a period of the first transmission signal, and v denotes a velocity of the object. $f_D$ denotes a phase shift value as a Doppler frequency by a Doppler effect. The reception signals $S_{21}$ and $S_{22}$ may include a Doppler effect component by the movement of the object. This Doppler effect component may act as a factor that prevents accurate estimation of an angle value with respect to a position of the object. An object velocity detecting apparatus may estimate a phase shift value corresponding to the Doppler effect component in the reception signals $S_{21}$ and $S_{22}$ based on an antenna overlapping method, for example.

Through the antenna overlapping method, a MIMO radar system may be designed such that the reception signal $S_{12}$ and the reception signal $S_{21}$ overlap each other, that is, phase differences, or phase path differences, of the reception signal $S_{12}$ and the reception signal $S_{21}$ are the same. In this case, the object velocity detecting apparatus may estimate the phase shift value due to the movement of the object based on a phase difference between the two reception signals $S_{12}$ and $S_{21}$. Phase differences of the reception signals $S_{12}$ and $S_{21}$ modeled in Equations 8 and 9 may be $d_r \sin \theta$ and $d_t \sin \theta$, respectively. For example, when the MIMO radar system is designed such that $d_r$ and $d_t$ have the same value, the phase differences of the reception signals $S_{12}$ and $S_{21}$ may be the same. In this example, between the reception signals $S_{12}$ and $S_{21}$, there may only be a difference between R and R'. By dividing Equation 9 by Equation 8, Equation 12 may be represented as below, for example. In Equation 12, when the signal magnitudes $A_{12}$ and $A_{21}$ are the same, a value obtained by dividing the modeled reception signal $S_{21}$ by the modeled reception signal $S_{12}$ may be a value of $e^{j2\pi f_D T_c}$.

$$\frac{S_{21}}{S_{12}} = \frac{A_{21}}{A_{12}} e^{jk2(R'-R)} = \frac{A_{21}}{A_{12}} e^{jk2vT_c} = \frac{A_{21}}{A_{12}} e^{j2\pi f_D T_c} \qquad \text{Equation 12}$$

A value obtained by dividing an actually observed (e.g., measured) value of the reception signal $S_{21}$ by an actually observed value of the reception signal $S_{12}$ may be the value of $e^{j2\pi f_D T_c}$ (e.g., when the signal magnitudes $A_{12}$ and $A_{21}$ are the same). Herein, $T_c$ denotes the period of the first transmission signal, which is a known value. Thus, the object velocity detecting apparatus may estimate the phase shift value $f_D$ by the Doppler effect using Equation 12, for example.

The object velocity detecting apparatus may compensate for the phase shift value caused by the Doppler effect that is estimated as described above, in the reception signals $S_{21}$ and $S_{22}$. The compensating may include removing the phase shift value caused by the Doppler effect from the reception signals $S_{21}$ and $S_{22}$. When compensated signals obtained by compensating for the phase shift value are $S_{21}'$ and $S_{22}'$, the compensated signals $S_{21}'$ and $S_{22}'$ may be modeled as represented respectively by Equations 13 and 14 below, for example.

$$S_{21}' = \frac{S_{21}}{e^{j2\pi f_D T_c}} = A_{21} e^{jk(2R + d_t \sin\theta)} = A_{21} e^{jk(2R + d_r \sin\theta)} \qquad \text{Equation 13}$$

$$S_{22}' = \frac{S_{22}}{e^{j2\pi f_D T_c}} = A_{22} e^{jk(2R + d_t \sin\theta + d_r \sin\theta)} = A_{22} e^{jk(2R + 2d_r \sin\theta)} \qquad \text{Equation 14}$$

An angle value of the object included in the signals $S_{11}$, $S_{12}$, $S_{21}'$, and $S_{22}'$ may prevent accurate estimation of a velocity of the object. Thus, the object velocity detecting apparatus may estimate the angle value of the object using the signals $S_{11}$, $S_{12}$, $S_{21}'$, and $S_{22}'$, and compensate for the estimated angle value in the reception signals $S_{21}$ and $S_{22}$. The object velocity detecting apparatus may remove, from the reception signals $S_{21}$ and $S_{22}$, an angle component that is not needed for (or may result in an inaccuracy in) the estimation of a velocity of the object. When compensated signals obtained by compensating for the angle value of the object are $S_{21}''$ and $S_{22}''$, the compensated signals $S_{21}''$ and $S_{22}''$ may be represented respectively by Equations 15 and 16 below, for example.

$$S_{21}'' = \frac{S_{21}}{e^{jkd_t \sin\theta}} = A_{21} e^{jk2R'} \qquad \text{Equation 15}$$

$$S_{22}'' = \frac{S_{22}}{e^{jkd_t \sin\theta}} = A_{22} e^{jk(2R' + d_r \sin\theta)} \qquad \text{Equation 16}$$

The object velocity detecting apparatus may then estimate a velocity of the object based on the compensated signals $S_{21}''$ and $S_{22}''$ obtained by compensating for the angle value. For example, the object velocity detecting apparatus may calculate a velocity of the object by applying a signal wavelength component derived based on the compensated signals $S_{21}''$ and $S_{22}''$ to a relational expression indicating a relationship between a Doppler frequency $f_D$ and a velocity v of the object.

Through this, a MIMO radar system including two transmitting antennas and two receiving antennas may operate as a MIMO radar system including one transmitting antenna and two receiving antennas. Thus, a maximum detectable velocity range that is limited in proportion to the number of transmitting antennas may be restored to a maximum detectable velocity range of a radar system having a single transmitting antenna.

Figure 8:
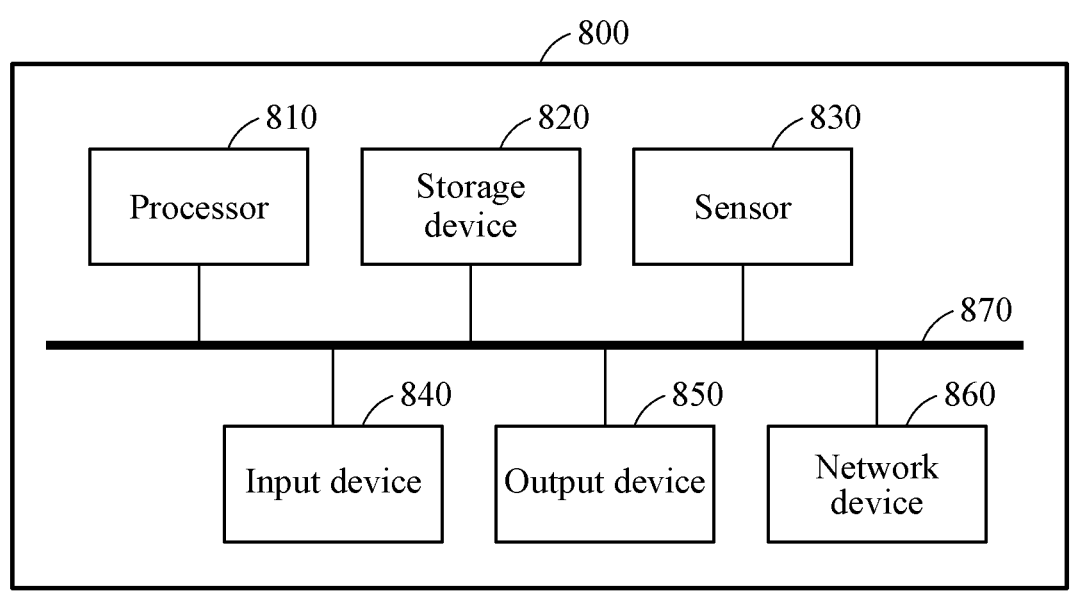
FIG. 8 illustrates an example of a computing device.

FIG. 8 illustrates an example of a computing device.

A computing device 800 may be an apparatus configured to perform a function of measuring a position of an object as described above with reference to FIG. 1. In addition, the computing device 800 may perform operations and functions of an object velocity detecting apparatus described above with reference to FIGS. 1 through 7B. The computing device 800 may be used in an autonomous driving system, a flight radar system, a deriver assistance system, an object recognition system, and a surveillance/security system, as non-limiting examples. The computing device 800 may operate by being provided in an image processing device, a radar device, a smartphone, a wearable device, a tablet computer, a net book, a laptop, a desktop, a head-mounted display (HMD), a self-driving vehicle, and a smart vehicle, as non-limiting examples.

Referring to FIG. 8, the computing device 800 may include a processor 810 (e.g., one or more processors), a storage device 820, a sensor 830, an input device 840, an output device 850, and a network device 860. The processor 810, the storage device 820, the sensor 830, the input device 840, the output device 850, and the network device 860 may communicate with one another through a communication bus 870.

The processor 810 may execute functions and instructions in the computing device 800. For example, the processor 810 may process instructions stored in the storage device 820. The processor 810 may perform one or more, or all, of the operations described above with reference to FIGS. 1 through 7B.

The storage device 820 may store information and data needed for the execution of the processor 810. The storage 820 may store instructions to be executed by the processor 810. The storage device 820 may include a computer-readable storage medium, for example, a random-access memory (RAM), a dynamic RAM (DRAM), a static RAM (SRAM), a magnetic hard disk, an optical disc, a flash memory, an erasable programmable read-only memory (EPROM), and other types of computer-readable storage medium that are known in the technical field to which the present disclosure pertains.

The sensor 830 may include at least one sensor. The sensor 830 may include a radar sensor and an image sensor, for example.

The input device 840 may receive an input from a user through a tactile, video, audio, or touch input. The input device 840 may include, for example, a keyboard, a mouse, a touchscreen, a microphone, and other devices that may detect an input from a user and transmit the detected input.

The output device 850 may provide an output of the computing device 800 to a user through a visual, auditory, or tactile channel. The output device 850 may include, for example, a liquid crystal display (LCD), a light-emitting diode (LED) display, a touchscreen, a speaker, a vibration generator, and other devices that may provide an output to a user. In an example, the output device 850 may provide a result of applying position information of an object estimated by the processor 810 using at least one of visual information, auditory information, or haptic information.

The network device 860 may communicate with an external device through a wired or wireless network. For example, the network device 860 may communicate with the external device using a wired communication method or a wireless communication method, such as, for example, Bluetooth, WiFi, 3G, and LTE.

The object velocity detecting apparatus, the computing device, and other apparatuses, devices, units, modules, devices, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:

1. An object velocity detection method, the method comprising:
    obtaining a first reception signal and a second reception signal that are received in first and second different time intervals corresponding to different transmission times by first and second different antennas in a radar sensor in a radar system, respectively, wherein a first phase difference of the first reception signal and a second phase difference of the second reception signal is based on a distance between the pair of antennas;
    generating a Doppler compensated first signal and a Doppler compensated second signal by respectively removing, from the second reception signal and another second reception signal received by the first antenna during the second time interval, a Doppler effect estimated dependent on the first reception signal and the second reception signal;
    estimating an angle value of an object, as an estimation of an included angle value in the second reception signal, dependent on the Doppler compensated first signal and the Doppler compensated second signal;
    generating an angle value compensated first signal and an angle compensated second signal by respectively removing the angle value from the Doppler compensated first signal and the Doppler compensated second signal; and
    determining a velocity of the object dependent on the angle value compensated first signal and the angle value compensated second signal.

2. The method of claim 1, wherein the estimating of the Doppler effect comprises determining a phase shift value from the movement of the object dependent on the first reception signal and the second reception signal, and
    wherein the generating of the Doppler compensated first signal and the Doppler compensated second signal includes respectively compensating for the phase shift value in the second reception signal and the other second reception signal.

3. The method of claim 2, wherein the phase shift value indicates a degree of a phase shift caused by the Doppler effect from the movement of the object.

4. The method of claim 2, wherein the determining of the phase shift value comprises:
    determining the phase shift value dependent on a distance between the first and second antennas, a total number of receiving antennas including the first and second antennas, and a distance between each of transmitting antennas included in the radar sensor.

5. The method of claim 1, further comprising obtaining third and fourth reception signals,
wherein the obtaining of the first and second reception signals and the third and fourth reception signals further comprises:
receiving the first and second reception signals in response to a first transmission signal transmitted in a first transmission time interval being reflected from the object; and
receiving the third and fourth reception signals in response to a second transmission signal transmitted in a second transmission time interval being reflected from the object.

6. The method of claim 5, wherein the first transmission signal and the second transmission signal are frequency-modulated continuous-wave (FMCW) signals generated based on a preset frequency modulation pattern.

7. The method of claim 5, wherein the first and second reception signals correspond to a first transmission signal and the third and fourth reception signals correspond to a second transmission signal.

8. The method of claim 1, wherein the radar system comprises a multiple-input and multiple-output (MIMO) radar system including a plurality of transmitting antennas and a plurality of receiving antennas including the first and second antennas, and wherein a distance between each of a plurality of pairs of reception antennas in the radar system is the same as the distance between each of a plurality of pairs of the transmitting antennas.

9. The method of claim 8, wherein the transmitting antennas are configured to alternately transmit a transmission signal in first and second different transmission time intervals respectively corresponding to the first time interval and the second different time interval.

10. The method of claim 8, wherein a maximum detectable velocity range of the object is determined irrespective of a number of the transmitting antennas.

11. The method of claim 10, wherein the maximum detectable velocity range of the object corresponds to a maximum velocity range that is detectable when the radar system includes a single transmitting antenna.

12. The method of claim 8, wherein the first reception signal and the second reception signal overlap each other.

13. A non-transitory computer-readable storage medium storing instructions that, when executed by a processor, configure the processor to perform the method of claim 1.

14. The method of claim 1, wherein the first reception signal and the second reception signal are transmitted by different transmitting antennas, and an other second reception signal is received by the first reception antenna.

15. The method of claim 1, wherein the determining of the velocity of the object is further dependent on a predetermined relationship between a doppler frequency and the velocity of the object.

16. The method of claim 15, wherein the determining of the velocity of the object is dependent on a signal component, derived from the angle value compensated first signal and the angle value compensated second signal, and the predetermined relationship between a doppler frequency and the velocity of the object.

17. The method of claim 16, wherein the signal component is a signal wavelength component.

18. The method of claim 1, wherein the estimating of the angle value is dependent on the Doppler compensated first signal, the Doppler compensated second signal, and the first reception signal.

19. An object velocity detection apparatus, the apparatus comprising:
a radar sensor including a plurality of antennas, including different first and second antennas; and
a processor configured to:
obtain a first reception signal and a second reception signal that are received in first and second different time intervals corresponding to different transmission times by the first and second antennas, respectively, wherein a first phase difference of the first reception signal and a second phase difference of the second reception signal is based on a distance between the pair of antennas;
estimate a Doppler effect component, with respect to a movement of an object, dependent on the first reception signal and the second reception signal;
generate a Doppler compensated first signal and a Doppler compensated second signal by respectively removing, from the second reception signal and another second reception signal received by the first antenna during the second time interval;
estimate an angle value of an object, as an estimation of an included angle value in the first and second reception signals, dependent on the Doppler compensated first signal and the Doppler compensated second signal;
generate a first angle value compensated signal and a second angle value compensated signal by removing the estimated angle value from the Doppler compensated first signal and the Doppler compensated second signal; and
determine a velocity of the object dependent on the first angle value compensated signal and the second angle value compensated signal.

20. The apparatus of claim 19, wherein, for the estimating of the Doppler effect, the processor is configured to determine a phase shift value from the movement of the object dependent on the first reception signal and the second reception signal, and wherein, for the generating of the Doppler compensated first signal and the Doppler compensated second signal, the processor is configured to respectively compensate for the phase shift value in the second reception signal and the other second reception signal.

21. The apparatus of claim 20, wherein, for the determining of the phase shift, the processor is configured to determine the phase shift value dependent on a distance between the first and second antennas, a total number of receiving antennas including a pair of reception antennas, and a distance between each of transmitting antennas included in the radar sensor.

22. The apparatus of claim 19, wherein the radar sensor is configured to:
receive, a first pair of reception signals including the first and second reception signals, a first reflection signal in response to a first transmission signal transmitted in a first transmission time interval being reflected from the object; and
receive, as a second pair of reception signals including an another first reception signal and the another second reception signal, a second reflection signal in response to a second transmission signal transmitted in a second transmission time interval being reflected from the object.

23. The apparatus of claim 22, wherein the first transmission signal and the second transmission signal are frequency-modulated continuous-wave (FMCW) signals generated based on a preset frequency modulation pattern.

24. The apparatus of claim 19, wherein the radar sensor is included in a radar system comprising a multiple-input and multiple-output (MIMO) radar system including a plurality of transmitting antennas and a plurality of receiving antennas including the first and second antennas.

25. The apparatus of claim 24, wherein the transmitting antennas are configured to alternately transmit a transmission signal in first and second different transmission time intervals respectively corresponding to the first time interval and the second different time interval.

26. The apparatus of claim 24, wherein a maximum detectable velocity range of the object is determined irrespective of a number of the transmitting antennas.

27. The apparatus of claim 26, wherein the maximum detectable velocity range of the object corresponds to a maximum velocity range that is detectable when the radar system includes a single transmitting antenna.

28. An object velocity detection method, the method comprising:
transmitting a first transmission signal through a transmitting antenna during a first transmission time interval;
transmitting a second transmission signal through a different transmitting antenna during a second different transmission time interval;
receiving, by each of first reception antennas and second different reception antennas of a plurality of receiving antennas, a first reception signal in response to the first transmission signal being reflected from an object and returned;
receiving, by each of the first reception antennas and the second different reception antenna, a second reception signal in response to the second transmission signal being reflected from the object and returned, wherein at least one of the first reception signals, received by a respective first reception antenna of the first reception antennas, and at least one of the second reception signals, received by a respective second reception antenna of the second reception antennas, a first phase difference of the first reception signal and a second phase difference of the second reception signal being based on a distance between the pair of antennas;
estimating a Doppler effect, with respect to a movement of the object, dependent on the at least one first reception signal and the at least one second reception signal;
generating one or more Doppler compensated first signals and one or more Doppler compensated second signals by respectively removing the Doppler effect from one or more of the second reception signals that are each received at a corresponding second reception antenna of the second reception antennas, and from one or more other second reception signals that are each received at a corresponding first reception antenna of the first reception antennas;
estimating an angle value of the object, as an estimation of an included angle value in the one or more of the second reception signals and the one or more other second reception signals, dependent on the one or more Doppler compensated first signals and the one or more Doppler compensated second signals;
generating angle value compensated signals by removing the estimated angle value from the second reception signals; and
determining a velocity of the object dependent on the generated angle value compensated signals.

29. The method of claim 28, wherein the first transmission signal and the second transmission signal are identical signals having a same carrier frequency characteristic.

30. The method of claim 28, wherein the first transmission signal and the second transmission signal are frequency-modulated continuous-wave (FMCW) signals.

31. The method of claim 28, wherein the signals overlapping each other are respectively transmitted by the transmitting antenna and the different transmitting antenna, and
wherein the estimating of the Doppler effect further comprises determining a phase difference between the first reception signal and the second reception signal.

32. The method of claim 28, wherein the estimating of the angle value of the object is dependent on the one or more Doppler compensated first signals, the one or more Doppler compensated second signals, and one or more of the first reception signals.

33. The method of claim 28, wherein the determining of the velocity of the object is dependent on a signal wavelength component, derived from the generated angle value compensated signals, and a predetermined relationship between a doppler frequency and the velocity of the object.

34. An object velocity detection method, the method comprising: receiving a first reception signal and a second reception signal in first and second different time intervals corresponding to different transmission times by first and second different antennas in a radar sensor, respectively, wherein a first phase difference of the first reception signal and a second phase difference of the second reception signal is based on a distance between the pair of antennas;
estimating a phase shift value, with respect to a movement of an object, dependent on the first reception signal and the second reception signal; generating a phase shift compensated signal by removing the phase shift value from the second reception signal;
determining an angle value of the object dependent on the first reception signal and the phase shift compensated signal;
generating an angle value compensated signal by removing the angle value from the second reception signal; and
determining a velocity of the object dependent on the generated angle value compensated signal.

* * * * *